(12) United States Patent
Alexander

(10) Patent No.: US 10,609,970 B2
(45) Date of Patent: Apr. 7, 2020

(54) PORTABLE, REUSABLE, AND RAPIDLY DEPLOYABLE PROTECTIVE COVER

(71) Applicant: David Alexander, Pasadena, CA (US)

(72) Inventor: David Alexander, Pasadena, CA (US)

( * ) Notice: Subject to any disclaimer, the term of this patent is extended or adjusted under 35 U.S.C. 154(b) by 0 days.

(21) Appl. No.: 16/444,244

(22) Filed: Jun. 18, 2019

(65) Prior Publication Data

US 2019/0328056 A1 Oct. 31, 2019

Related U.S. Application Data

(62) Division of application No. 15/011,272, filed on Jan. 29, 2016, now abandoned.

(60) Provisional application No. 62/109,398, filed on Jan. 29, 2015.

(51) Int. Cl.
*A41D 13/04* (2006.01)
*B60N 2/60* (2006.01)

(52) U.S. Cl.
CPC ........... *A41D 13/04* (2013.01); *B60N 2/6027* (2013.01); *B60N 2/6036* (2013.01); *A41D 2400/42* (2013.01)

(58) Field of Classification Search
CPC .... A41D 13/04; A41D 2400/42; A47C 7/021; A47C 31/11; A47C 7/0213; B60N 2/6027; B60N 2/60; B60N 2/6036
See application file for complete search history.

(56) References Cited

U.S. PATENT DOCUMENTS

| | | | | |
|---|---|---|---|---|
| 1,108,557 A | * | 8/1914 | Dudley | A41B 13/106 2/49.5 |
| 3,817,574 A | * | 6/1974 | McNab | A45C 9/00 297/188.04 |
| 5,220,692 A | * | 6/1993 | Cox | A41D 13/04 2/46 |
| 5,642,674 A | * | 7/1997 | Joye, Sr. | A47B 23/002 108/25 |
| 2016/0174632 A1 | * | 6/2016 | Cox | A41D 13/04 2/52 |

* cited by examiner

*Primary Examiner* — Milton Nelson, Jr.

(57) ABSTRACT

The present invention is generally directed to a portable, reusable, and rapidly deployable protective cover configured to be worn over a person's clothing and to protect portions of the person's torso and lap from liquid and solid spills, particularly while in a seated position, such as when sitting in a vehicle.

10 Claims, 13 Drawing Sheets

PORTABLE, REUSABLE, AND RAPIDLY DEPLOYABLE PROTECTIVE COVER

CROSS REFERENCE TO RELATED APPLICATIONS

This application is a divisional of U.S. patent application Ser. No. 15/011,272, filed Jan. 29, 2016, which claims the benefit of U.S. provisional patent application No. 62/109,398, filed Jan. 29, 2015, the entire disclosures of which are incorporated herein by reference in their entirety.

FIELD OF THE INVENTION

This invention relates generally to protective devices, and, more particularly, to a portable, reusable, and rapidly deployable protective cover configured to be worn over a person's clothing and protect portions of the person's torso and lap from liquid and solid spills, particularly while in a seated position, such as when sitting in a vehicle.

BACKGROUND OF THE INVENTION

It has become increasingly popular for drivers and passengers in vehicles to eat and drink while in transit, which often results in spills due to vehicle movements (e.g., accelerations and decelerations; encountering bumps in the road; swerving of the vehicle). Even in a parked vehicle, drivers and passengers may have difficulty keeping clean, as a vehicle offers limited space, which can make handling beverages or food sometimes difficult and awkward.

As a result, those who consume food while in a vehicle often have debris drop onto their clothing or vehicle seat. Such debris usually falls upon a person's chest, lap, or outer extremities, thus soiling his/her clothing. In addition to causing a mess, fallen debris can be hazardous, as it may distract a driver when operating the vehicle, which may result in a serious accident.

It has been well known for drivers and passengers to cover one or more portions of their body (e.g., torso, lap, etc.) with a paper or cloth napkin, but this does not protect a person from liquid spills. Furthermore, paper or cloth napkins are generally inadequate in ensuring that a majority of a person's body is covered, particularly while in a seated position. For example, a napkin typically fails to extend over a person's torso and lap, and is rather limited to one or the other, which either results in an area being exposed to falling debris or causes a person to use multiple napkins to cover large areas, which can be cumbersome and frustrating for some.

Bibs and aprons are known to be used to protect a person's clothing and prevent or reduce the likelihood of clothes becoming soiled. Some bibs or aprons are substantial in size, such that they cover the torso and lap. However, the use of large bibs/aprons in a vehicle can be troublesome. For example, a large bib/apron may be difficult to manage and manipulate in tight quarters, either when attempting to put the bib/apron on (e.g., properly place and position over one's chest and lap) or take the bib/apron off. Furthermore, storage of the bib/apron when not in use can also be frustrating for some, as most people would generally crumple the bib/apron into a ball and throw the bib/apron onto the floor, another seat, or even the glove box. Thus, when the time comes to reuse the bib/apron, it may not be easily accessible for a driver or passenger.

BRIEF SUMMARY OF THE INVENTION

As it has become increasingly popular for drivers and passengers in vehicles to eat and drink while in transit, it often troublesome to protect a person's clothing and/or the interior of the vehicle from being stained by dropped food or beverages. The present invention is a portable, reusable, and rapidly deployable protective cover configured to be worn over a person's clothing and protect portions of the person's torso and lap from liquid and solid spills, particularly while in a seated position, such as when sitting in a vehicle.

The protective cover of the present invention is shaped and sized so as to provide protection over multiple portions of a person's body, including, but not limited to, upper torso, lower torso, lap region, and sides of the torso and/or lap region. Accordingly, the cover is configured to prevent spills from making contact with a person's clothing that is most exposed when a person is in a seated position, such as when in a vehicle, either as a driver or passenger. The cover may include absorbent, waterproof, and/or stain resistant materials. For example, an underside of the cover (portion in direct contact with person's clothing) may be composed of a durable, waterproof material so as to prevent any solid or liquid from penetrating through the cover and into clothing. A top surface of the cover (portion exposed to any spillage) may be composed of an absorbent material so as to trap liquid spills. Alternatively, the top surface of the cover may be composed of a waterproof material. Additionally, or alternatively, one or more portions of the cover may be composed of a material having insulating properties, such as thermal insulation, so as to prevent the transfer of heat from a hot food or beverage through to a person's torso or lap.

The protective cover of the present invention is further is configured to be rapidly assembled and disassembled so as to provide ease of use, particularly when sitting in tight spaces, such as those provided in a vehicle. In particular, the cover may include a bi-stable member configured to transition between two stable configurations; a compact configuration; and an expanded configuration. When in the stable compact configuration, the bi-stable member has a compact shape and thereby results in the cover having a compact state allowing for subsequent storage when not in use. In some embodiments the compact configuration may be in the form of a rolled up shape. When the bi-stable member is in the stable expanded configuration, the bi-stable member has an expanded, substantially planar shape along a length thereof, thereby resulting in the cover having an expanded state for subsequent use. Upon use, the user need only deform the bi-stable member into the compact configuration, which in turn, rapidly returns the cover to a compact state.

Once in the compact state, the cover may be conveniently stored within the interior of the vehicle and within reach of the driver or passenger for subsequent use. For example, the cover may include a fastener mechanism for releasably coupling the cover to a portion of a vehicular seat belt system. The fastener mechanism may include a pair of opposing ties configured to be releasably coupled to one another around a shoulder harness portion or a lap portion of the seat belt system, such that the cover is always within reach. In some embodiments, the cover, when in a compact state, may be stored within a separate receptacle or pouch, wherein the pouch may include a fastener mechanism for releasably coupling the pouch to an interior component of the vehicle, such as the seat belt system or the center console.

According to one aspect, the present invention includes a rapidly deployable protective cover configured to be worn over a portion of a user's body to protect from liquid or solid spills. The cover includes an upper member, a lower member materially coupled to the upper member, first and second side members materially coupled to and extending from opposing sides of at least one of the upper member and the lower member, and at least one bi-stable member configured to transition the cover between a compact state and an expanded state.

In some embodiments, the at least one bi-stable member is coupled to at least one of the upper member, the lower member, and the first and second side members. The at least one bi-stable member comprises at least two stable configurations and is elastically deformable between the first and second stable configurations. When in the first stable configuration, the bi-stable member has a compact shape and thereby results in the cover having a compact state. The compact shape is a rolled configuration such that at least one of the upper member, the lower member, and the first and second side members coupled to the bi-stable member has a corresponding rolled configuration.

When in the second stable configuration, the bi-stable member has an expanded, substantially planar shape along a length thereof, thereby resulting in the cover having an expanded state. At least one of the upper member, the lower member, and the first and second side members coupled to the bi-stable member has a corresponding expanded configuration when the bi-stable member is in the second stable configuration. When the bi-stable member is in the second stable configuration and the cover is in the expanded state, the upper member is configured to cover at least a portion of a user's torso, the lower member is configured to cover at least a portion of the user's lap, and the first and second side members are configured to cover side portions of at least one of the user's torso or user's lap.

In some embodiments, when the cover is in the compact state, the overall area of the cover is smaller than the overall area of the cover when the cover is in the expanded state. When the cover is in the compact state, at least two of the upper member, the lower member, and the first and second side members are releasably coupled to one another via one or more releasable fastening members. The one or more releasable fastening members include, but are not limited to, one or more magnets, hook and loop fasteners, snap-fit fasteners, adhesive, and a combination thereof.

In some embodiments, the cover further includes a pair of opposing ties materially coupled to the upper member and configured to be releasably coupled to one another around the user's neck.

In some embodiments, at least one of the upper member, the lower member, and the first and second side members further comprises a fastener mechanism for releasably coupling the cover to a portion of a vehicular seat belt system. The fastener mechanism comprises a pair of opposing ties configured to be releasably coupled to one another around a shoulder harness portion or a lap portion of the seat belt system.

In some embodiments, the cover further includes an insertable member configured to provide a substantially planar surface on the lower member thereby providing a user with a stable surface for food or beverages when in a seated position.

According to another aspect, the present invention provides a system configured to protect a user from liquid or solid spills. The system includes a rapidly deployable protective cover configured to be worn over a portion of a user's body. The cover includes an upper member, a lower member materially coupled to the upper member, first and second side members materially coupled to and extending from opposing sides of at least one of the upper member and the lower member and at least one bi-stable member coupled to at least one of the upper member, the lower member, and the first and second side members. The bi-stable member is configured to elastically deform between a stable compact configuration and a stable expanded configuration to thereby transition the cover between a compact state and an expanded state, respectively. The system further includes a receptacle configured to receive and house the cover when the cover is in the compact state. The receptacle includes a fastener mechanism for releasably coupling the receptacle to a portion of a vehicular seat belt system.

In some embodiments, the compact configuration is a rolled configuration such that at least one of the upper member, the lower member, and the first and second side members coupled to the bi-stable member has a corresponding rolled configuration. In some embodiments, the expanded configuration is a substantially planar shape along a length of the bi-stable member such that at least one of the upper member, the lower member, and the first and second side members coupled to the bi-stable member has a corresponding expanded configuration.

When the cover is in the compact state, the overall area of the cover is smaller than the overall area of the cover when the cover is in the expanded state. When the cover is in the compact state, at least two of the upper member, the lower member, and the first and second side members are releasably coupled to one another via one or more releasable fastening members. The one or more releasable fastening members are selected from the group consisting of: one or more magnets, hook and loop fasteners, snap-fit fasteners, adhesive, and a combination thereof.

When the bi-stable member is in the stable expanded configuration and the cover is in the expanded state, the upper member of the cover is configured to cover at least a portion of a user's torso, the lower member is configured to cover at least a portion of the user's lap, and the first and second side members are configured to cover side portions of at least one of the user's torso or user's lap.

In some embodiments, the cover further comprises a pair of opposing ties materially coupled to the upper member and configured to be releasably coupled to one another around the user's neck.

In some embodiments, at least one of the upper member, the lower member, and the first and second side members further comprises a fastener mechanism for releasably coupling the cover to a portion of a vehicular seat belt system.

The fastener mechanism for releasably coupling the receptacle to a portion of a vehicular seat belt system comprises a pair of opposing ties configured to be releasably coupled to one another around a shoulder harness portion or a lap portion of the seat belt system.

In some embodiments, the cover further includes an insertable member configured to provide a substantially planar surface on the lower member of the cover thereby providing a user with a stable surface for food or beverages when in a seated position.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

DETAILED DESCRIPTION OF THE INVENTION

Figure 1:
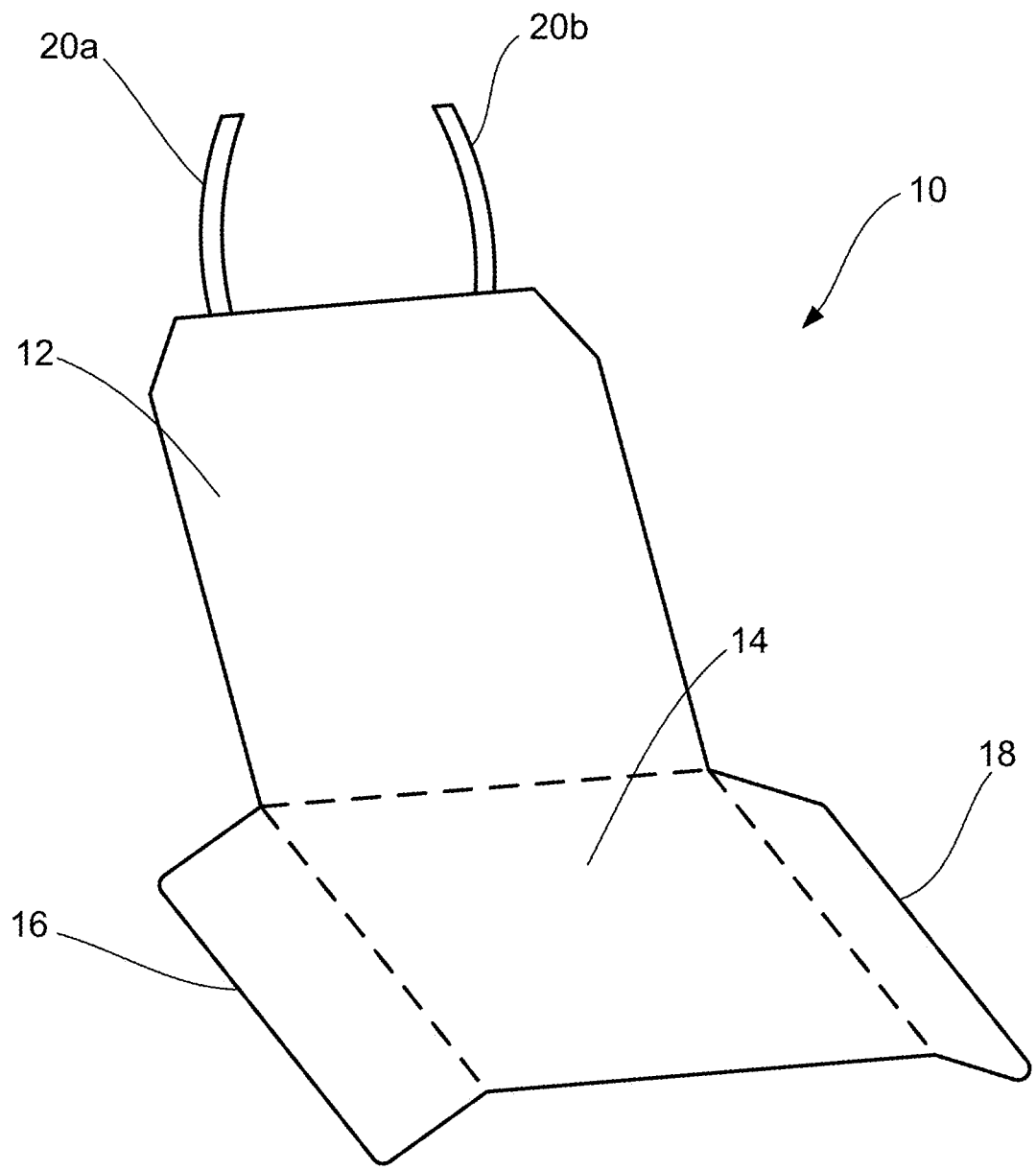
FIG. 1 is a perspective view of a protective cover in an expanded state consistent with the present disclosure.

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

By way of overview, the present invention is generally directed to a portable, reusable, and rapidly deployable protective cover configured to be worn over a person's clothing and protect portions of the person's torso and lap from liquid and solid spills, particularly while in a seated position, such as when sitting in a vehicle. As it has become increasingly popular for drivers and passengers in vehicles to eat and drink while in transit, it often troublesome to protect a person's clothing and/or the interior of the vehicle from being stained by dropped food or beverages.

The protective cover of the present invention is shaped and sized so as to provide protection over multiple portions of a person's body, including, but not limited to, upper torso, lower torso, lap region, and sides of the torso and/or lap region. Accordingly, the cover is configured to prevent spills from making contact with a person's clothing that is most exposed when a person is in a seated position, such as when in a vehicle, either as a driver or passenger. The cover may include absorbent, waterproof, and/or stain resistant materials. For example, an underside of the cover (portion in direct contact with person's clothing) may be composed of a durable, waterproof material so as to prevent any solid or liquid from penetrating through the cover and into clothing. A top surface of the cover (portion exposed to any spillage) may be composed of an absorbent material so as to trap liquid spills. Alternatively, the top surface of the cover may be composed of a waterproof material. Additionally, or alternatively, one or more portions of the cover may be composed of a material having insulating properties, such as thermal insulation, so as to prevent the transfer of heat from a hot food or beverage through to a person's torso or lap.

The protective cover of the present invention is further is configured to be rapidly assembled and disassembled so as to provide ease of use, particularly when sitting in tight spaces, such as those provided in a vehicle. In particular, the cover may include a bi-stable member configured to transition between two stable configurations; a compact configuration; and an expanded configuration. When in the stable compact configuration, the bi-stable member has a compact shape and thereby results in the cover having a compact state allowing for subsequent storage when not in use. In some embodiments the compact configuration may be in the form of a rolled up shape. When the bi-stable member is in the stable expanded configuration, the bi-stable member has an expanded, substantially planar shape along a length thereof, thereby resulting in the cover having an expanded state for subsequent use. Upon use, the user need only deform the bi-stable member into the compact configuration, which in turn, rapidly returns the cover to a compact state.

Once in the compact state, the cover may be conveniently stored within the interior of the vehicle and within reach of the driver or passenger for subsequent use. For example, the cover may include a fastener mechanism for releasably coupling the cover to a portion of a vehicular seat belt system. The fastener mechanism may include a pair of opposing ties configured to be releasably coupled to one another around a shoulder harness portion or a lap portion of the seat belt system, such that the cover is always within reach. In some embodiments, the cover, when in a compact state, may be stored within a separate receptacle or pouch, wherein the pouch may include a fastener mechanism for releasably coupling the pouch to an interior component of the vehicle, such as the seat belt system or the center console.

FIG. 1 is a perspective view of a protective cover 10 consistent with the present disclosure. As shown, the cover 10 generally includes an upper member 12, a lower member 14 materially coupled to the upper member 12, and first and second side members 16, 18 materially coupled to and extending from opposing sides of at least one of the upper member 12 and the lower member 14. In the illustrated embodiment, for example, the first and second side members 16, 18 extend from opposing sides of the lower member 14.

As shown, each of the upper member 12, lower member 14, and side members 16, 18 may be formed from a single piece of material. In other embodiments, one or more members may be discrete and separate from one another prior to coupling to one another. Accordingly, one or more members may be materially coupled to other members via any known coupling means, including, but not limited to, stitching, riveting, welding, stapling, adhesive bonding, hook and loop type fasteners, and/or any other suitable joining technology.

When in the expanded state, as shown, the protective cover 10 is configured to cover multiple portions of a user's body so as to protect clothing from any spilled liquids or solids that a user may be consuming. For example, the upper member 12 is configured to cover at least a portion of a user's torso, including a user's chest and stomach. The lower member 14 is configured to cover at least a portion of the user's lap and thighs. The first and second side members 16, 18 are configured to cover side portions of the user's lap and thighs. Accordingly, once in the expanded state and positioned over a user's body, the protective cover 10 of the present invention provides adequate protective coverage, particularly protecting areas of a user's body that are most susceptible to receiving falling debris or liquid.

The cover 10 may further include a pair of opposing ties 20a, 20b materially coupled to the upper member 12 and configured to be releasably coupled to one another around the user's neck. For example, in one embodiment, the opposing ties 20a, 20b may be tied together via a simple knot for securing the protective cover to a user. In other embodiments, the opposing ties 20a, 20b may include any known fastener mechanism, including, for example, hook and loop fastener (VELCRO), snap-fit fastener (e.g., buckle, snap buttons, etc.), and the like. Yet still, the opposing ties 20a, 20b may each include a magnet, such that the opposing ties 20a, 20b are coupled to one another based on the attractive forces between the magnets.

The cover 10 may include any type of durable material configured to reasonably withstand and, in some cases, repel liquids or solids. The cover 10 may include absorbent, waterproof, and/or stain resistant materials. For example, an underside of the cover 10 (portion in direct contact with person's clothing) may be composed of a durable, waterproof material so as to prevent any solid or liquid from penetrating through the cover and into clothing. A top surface of the cover 10 (portion exposed to any spillage) may be composed of an absorbent material so as to trap liquid spills. Alternatively, the top surface of the cover 10 may be composed of a waterproof material. Additionally, or alternatively, one or more portions of the cover may be composed of a material having insulating properties, such as thermal insulation, so as to prevent the transfer of heat from a hot food or beverage through to a person's torso or lap. Accordingly, the cover 10 may be form from multiple layers, as generally understood by one skilled in the art. Durable materials may include, for example, molded polymers, plastics, neoprene, mesh, leather, vinyl, fabric, reinforced fabric, or any combination thereof.

The protective cover 10 of the present invention is further configured to be rapidly assembled and disassembled so as to provide ease of use, particularly when sitting in tight spaces, such as those provided in a vehicle. More specifically, the protective cover is configured to transition between compact and expanded states by way of one or more releasable fastening members and/or bi-stable members coupled to one or more of the upper, lower, and side members.

Figure 2:
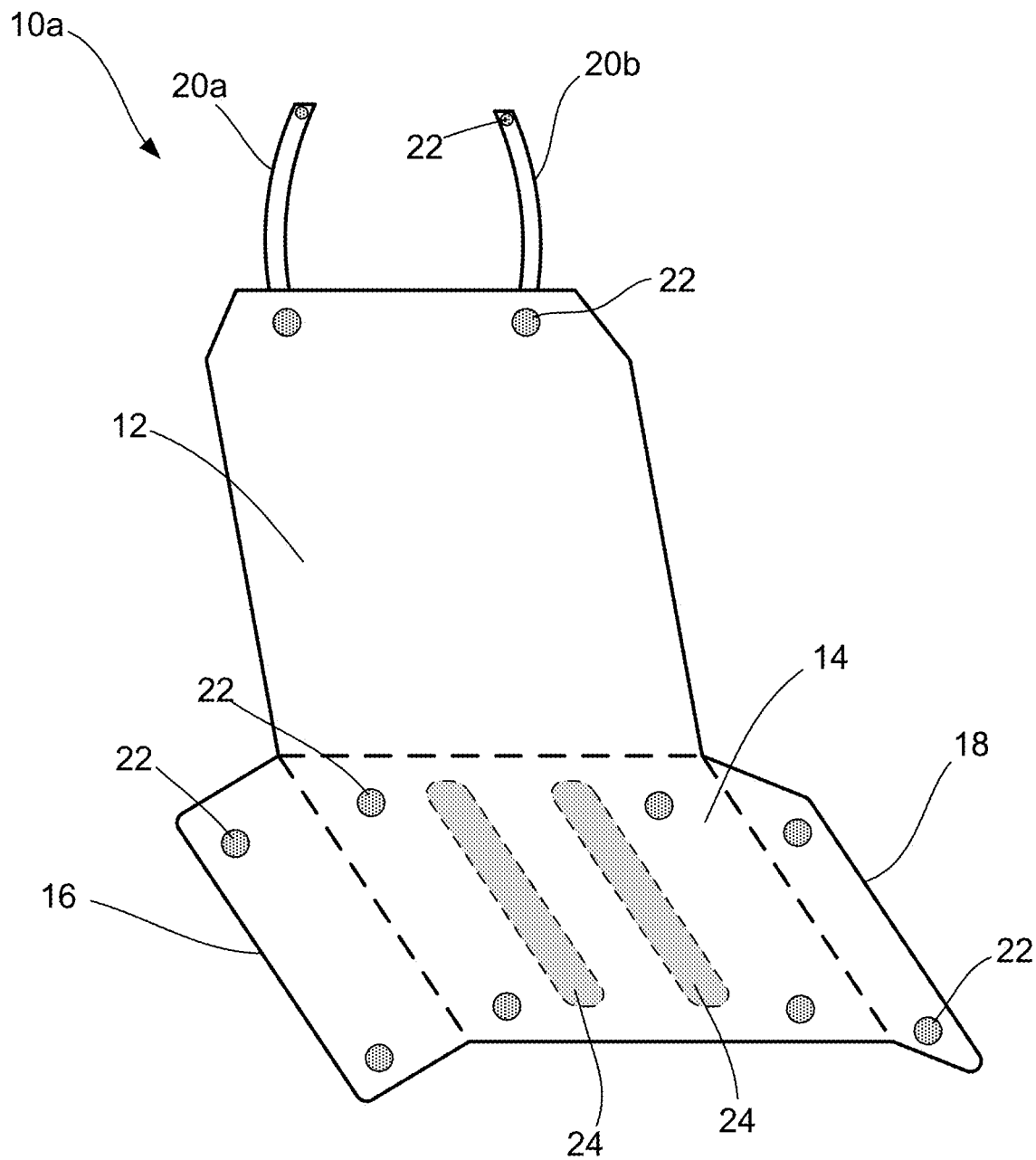
FIG. 2 is a perspective view of the protective cover of FIG. 1 illustrating a first configuration of bi-stable members.
Figure 3:
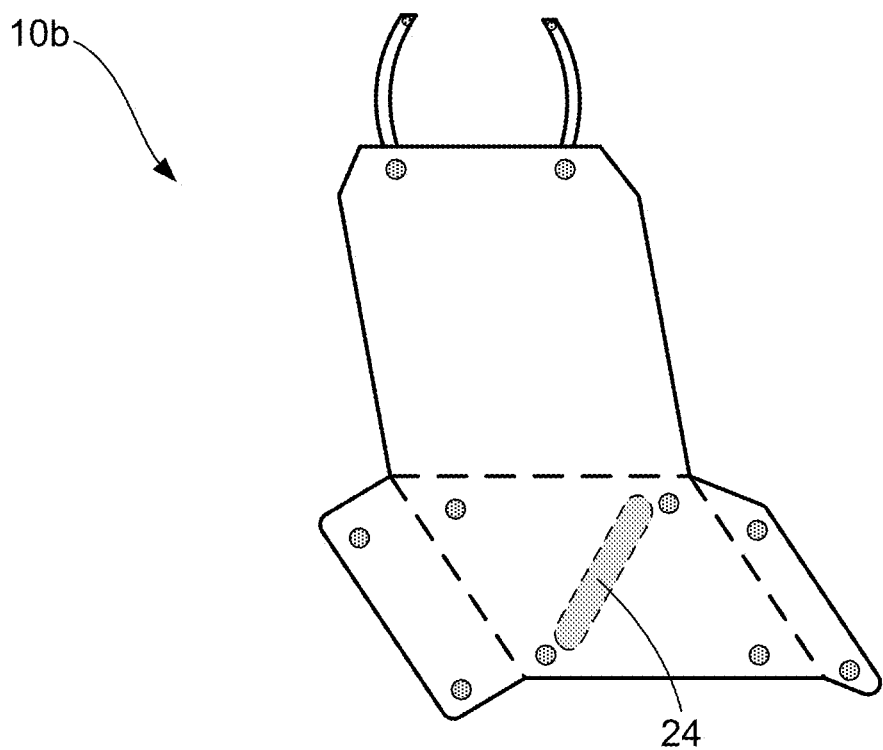
FIG. 3 is a perspective view of the protective cover of FIG. 1 illustrating a second configuration of a bi-stable member.
Figure 4:
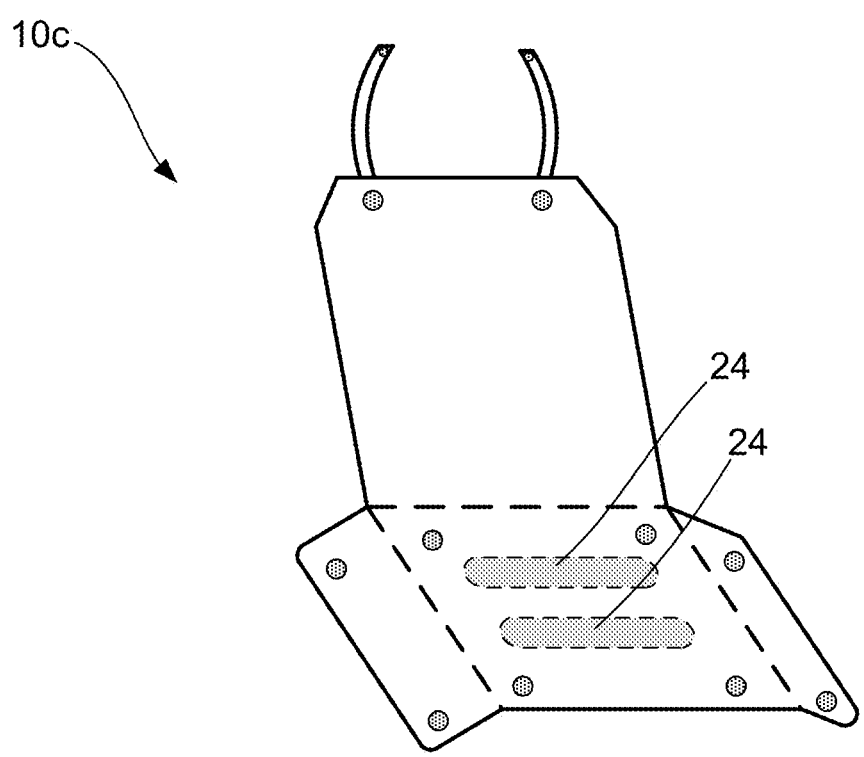
FIG. 4 is a perspective view of the protective cover of FIG. 1 illustrating a third configuration of bi-stable members.

For example, FIGS. 2-4 illustrate different embodiments of a protective cover 10a-10c, respectively, having different configurations of one or more fastening members 22 and bi-stable members 24. As shown in FIG. 2, the protective cover 10a may include a plurality of releasable fastening members 22 configured to releasably couple the upper 12, lower 14, and side members 16, 18 to one another to aid in transitioning the cover 10 from an expanded state to a compact state. For example, the upper member 12 and each of the side members 16, 18 may be folded inwardly toward the lower member 14 (see FIG. 6A), as indicated by fold lines (shown as broken lines). Releasable fastening members 22 on each of the members 12-18 may correspond to one another such that, upon folding, associated sets of fastening members 22 connect to one another, thereby releasably coupling the upper member 12 and side members 16, 18 to the lower member 14 so as to aid in maintaining the cover 10 in a compact state. The releasable fastening members 22 may include, but are not limited to, magnets, hook and loop fasteners, snap-fit fasteners, reusable adhesive, and the like.

The cover may further include at least one bi-stable member 24 configured to further move the cover 10 between a compact state and an expanded state. As shown, the cover 10a includes two bi-stable members 24 coupled to the lower member 14 and arranged substantially parallel to one another, extending from a front to rear of the lower member 14. It should be noted that any number of bi-stable members 24 may be included on the cover 10 and may be coupled to any one of the upper, lower, and side members. For example, the cover 10b of FIG. 3 shows a single bi-stable member 24 coupled to the lower member 14 and extending across the surface of the lower member 14 at an angle. The cover 10c of FIG. 4 shows two bi-stable members 24 arranged substantially parallel to one another and extending between opposing sides of the lower member 14 from the first side 16 to the second side 18.

The bi-stable members 24 are elastically deformable between first and second stable configurations. For example, when in the first stable configuration, the bi-stable member has a compact shape and thereby results in the cover having a compact state. For example, as will be described in greater detail herein, and shown in FIG. 6B, the compact shape is a rolled configuration such that at least one of the upper member, the lower member, and the first and second side members coupled to the bi-stable member 24 has a corresponding rolled configuration. Depending on the orientation and placement of the bi-stable member 24, the cover can move into a compact state in different manners, as will be described in greater detail herein.

FIGS. 2-4 illustrate the bi-stable members 24 in a second stable configuration, in which each bi-stable member 24 has an expanded, substantially planar shape along a length thereof, thereby resulting in the cover having an expanded state. Accordingly, at least one of the upper member, the lower member, and the first and second side members coupled to the bi-stable member 24 has a corresponding expanded configuration. Accordingly, when the bi-stable member 24 is in the expanded configuration and the cover is in the expanded state, the upper member 12, lower member 14, and side members 16, 18 can be separated from one another and deployed into position over the user, such that the upper member 12 can cover at least a portion of a user's torso, the lower member 14 is configured to cover at least a portion of the user's lap, and the first and second side members 16, 18 are configured to cover side portions of at least one of the user's torso or user's lap.

The bi-stable member 24 described herein may include any type of material configured to transition between at least two stable configurations (e.g., compact and expanded). Accordingly, the bi-stable member 24 may include an elastically deformable material configured to allow for the deformation performance characteristics of member 24 to be controllably varied so that a deformable bi-stable member 24 can be readily moved from one stable position (e.g., compact state) to another stable position (e.g. expanded state). The bi-stable member 24 may include a shape memory material, including, but not limited to, a shape-memory alloy (SMA, smart metal, memory metal, memory alloy, muscle wire, smart alloy) or a shape-memory polymer. "Shape memory alloy" or "SMP", or "Shape memory Polymer" or "SMP", generally refers to a metallic or polymeric material, which exhibits a change in a property, such as an elastic modulus, a shape, a dimension, a shape orientation, or a combination comprising at least one of the foregoing properties upon application of an activation signal. In the simplest terms, an application of physical force may be sufficient to move the bi-stable member 24 between the compact and expanded configurations described herein.

Figure 5:
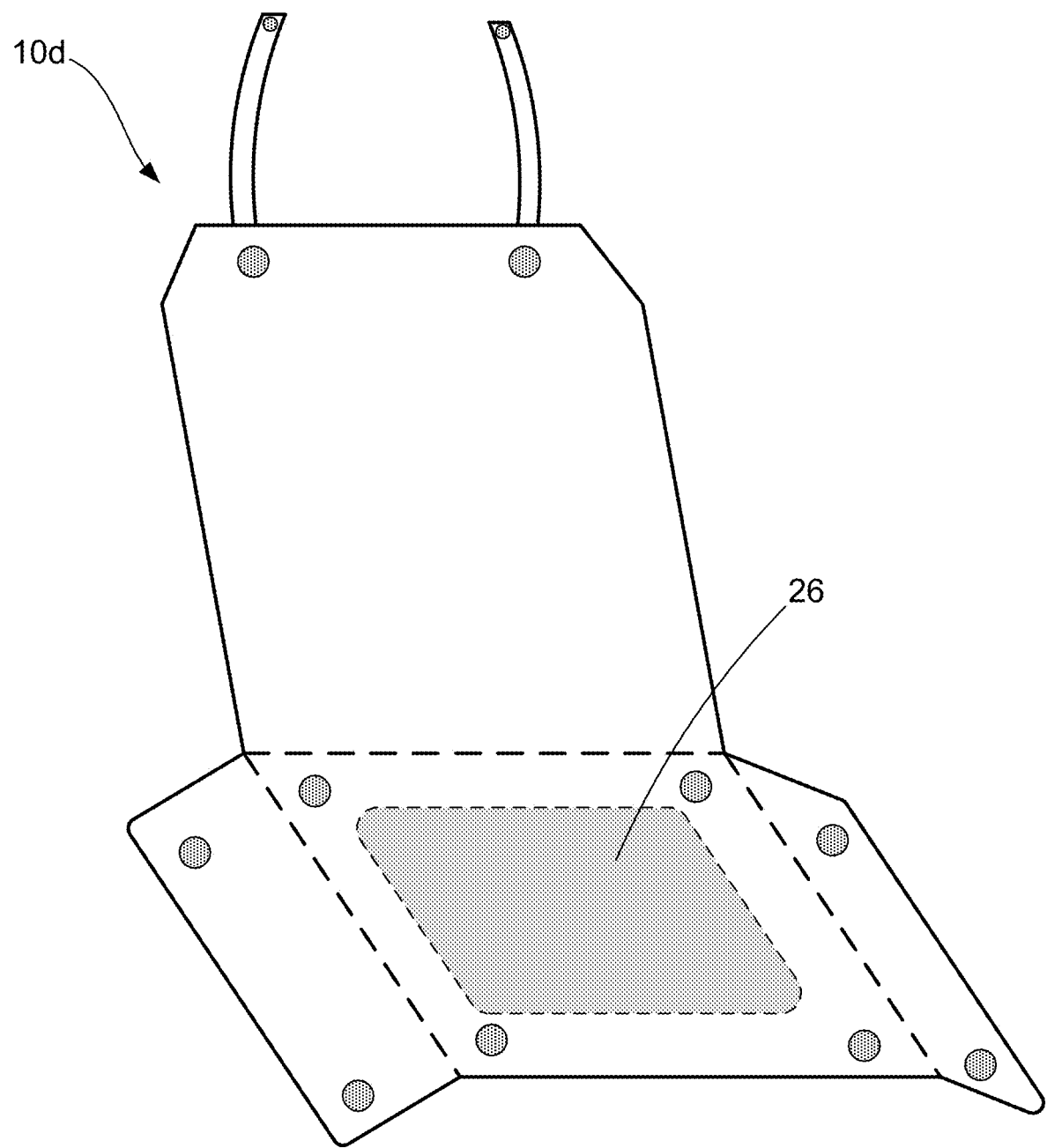
FIG. 5 is a perspective view of the protective cover of FIG. 1 illustrating the inclusion of an insertable member for providing a stable surface.

As shown in FIG. 5, a protective cover 10d consistent with the present disclosure may further include an insertable member 26 for providing a stable surface. For example, the insertable member 26 may be inserted within a pocket formed on the lower member 14 of the cover 10. The insertable member 26 may be formed of a relatively rigid material so as to provide a substantially planar surface on the lower member 14, thereby providing a user with a stable surface for food or beverages when in a seated position. When a user is ready to store the cover 10d, they need only remove the insertable member 26 and transition the cover 10d to a compact state for storage. The insertable member 26 may also include one or more pre-formed fold lines (e.g., living hinges) to allow the insertable member 26 to be folded into a more compact state for storage. In some embodiments, the insertable member 26 may be permanently affixed within the lower member 14 and may be of a bi-stable nature, such that it is able to roll into a compact configuration and unroll in to an expanded configuration, similar to the bi-stable members 24 previously described herein. The insertable member 26 maybe composed of a material having insulating properties, such as thermal insulation, so as to prevent the transfer of heat from a hot food or beverage through to a person's torso or lap.

Figure 6A:
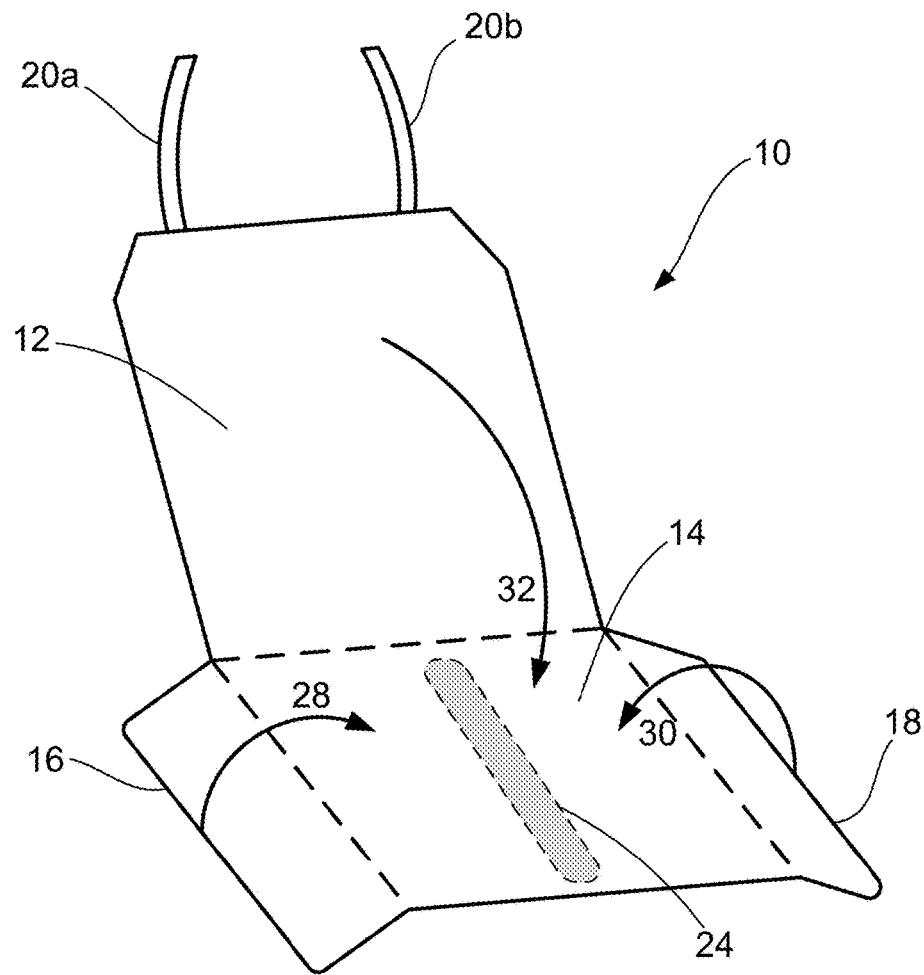
FIGS. 6A and 6B are perspective views of the protective cover of FIG. 1 illustrating the cover transitioning from the expanded state to the compact state.
Figure 6B:
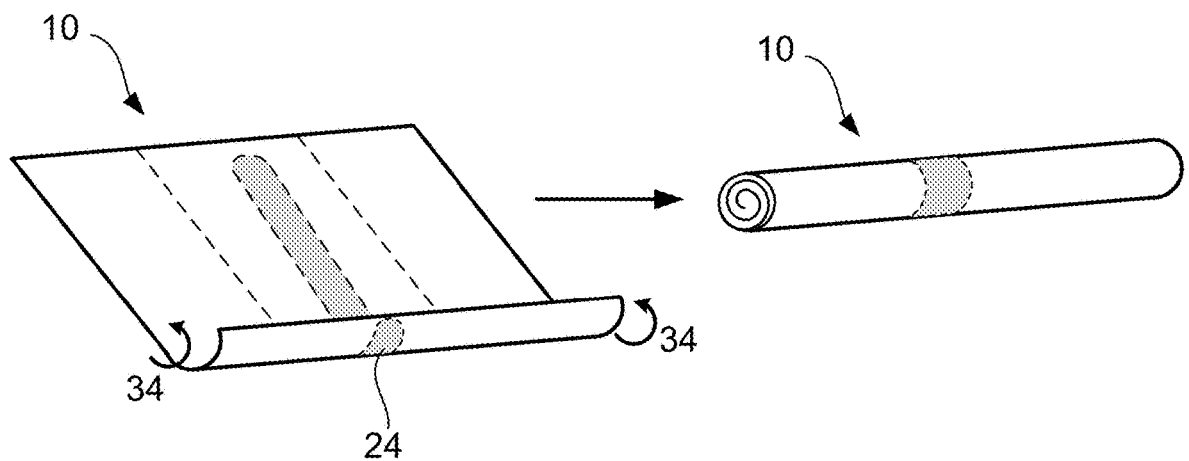

FIGS. 6A and 6B are perspective views illustrating the protective cover 10 transitioning from the expanded state to a compact state. As previously described, the protective cover 10 of the present invention is configured to be rapidly assembled and disassembled. As shown, the first and second side members 16, 18 may each be folded inwardly towards the lower member 14, as indicated by arrows 28 and 30, respectively. In some embodiments, fastening members 22 may be included on the first and second side members 16, 18, wherein such fastening members 22 correspond to associated fastening members 22 on the lower member 14, such that corresponding fastening members 22 come into contact with one another and releasably couple the first and second side members 16, 18 to the lower member 14. The upper member 12 may then be folded inwardly to come into contact with the lower member 14, as indicated by arrow 32. Similarly, the upper member 12 may include releasable fastening members 22 to contact corresponding releasable fastening members 22 on the lower member 14 so as to releasably couple the upper and lower members 12, 14 to one another.

Once folded together, a user may then move the bi-stable member 24 from the expanded configuration to the compact configuration, as shown in FIG. 6B. In the illustrated embodiment, the compact configuration of the bi-stable member 24 is a rolled configuration. Accordingly, as the bi-stable 24 moves to the compact rolled configuration, the lower member 14, as well as the inwardly folded upper member 14, and side members 16, 18 releasably coupled to the lower member 12, are forced into a roll configuration, as indicated by arrow 34. Accordingly, the cover 10 rolled up into a compact state, such that the overall area of the cover 10 is smaller than the overall area of the cover 10 when it is in the expanded state, which allows easier storage and handling of the cover 10 when not in use.

Figure 6C:
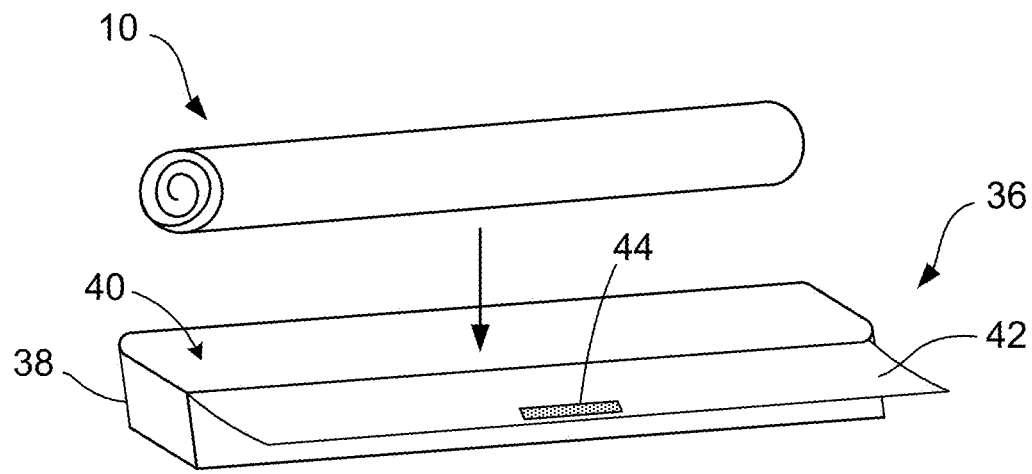
FIG. 6C is a perspective view of the protective cover in a compact state and illustrating storage of the cover within a receptacle.
Figure 7:
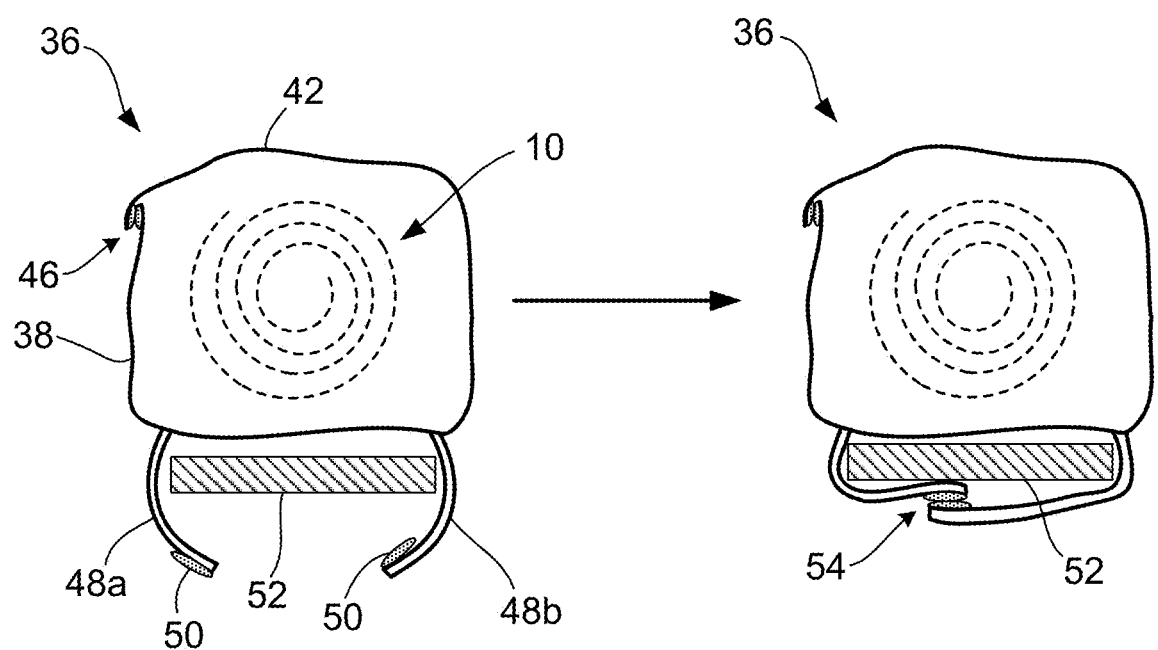
FIG. 7 is a side view of the receptacle of FIG. 6C including the protective cover stored within and illustrating coupling of the receptacle to a seat belt.

Once in the compact state, the cover 10 may be conveniently stored within the interior of the vehicle and within reach of the driver or passenger for subsequent use. For example, FIG. 6C is a perspective view illustrating subsequent storage of the cover 10 within a receptacle or pouch 36. The pouch 36 generally includes a body 38 having sidewalls and defining an interior cavity 40 for receiving and housing the cover 10 within. The pouch 36 may further include a closure member 42 configured to cover an opening to the interior cavity 40 so as to secure the cover 10 within. The closure member 42 may include, for example, a fastener 44, such as a hook and loop fastener, configured to be coupled to an associated fastener on the pouch body 38, as shown in FIG. 7 (indicated by arrow 46).

In some embodiments, the pouch 36 may include a fastener mechanism for releasably coupling the pouch 36 to a component of the vehicle. FIG. 7 is a side view of the pouch 36 illustrating coupling of the pouch to a portion of a seat belt system, for example. As shown, the fastener mechanism for releasably coupling the pouch a portion of a vehicular seat belt system includes a pair of opposing ties 48a, 48b configured to be releasably coupled to one another via fasteners 50 (e.g., hook and loop fasteners, magnets, etc.). The opposing ties 48a, 48b may generally resemble flaps of material extending from the body 38 of the pouch 36. As shown, the opposing ties 48a, 48b may be coupled to one another around a portion of the seat belt 52, as indicated by arrow 54, such as the shoulder harness portion or the lap portion of a seat belt. Accordingly, by attaching the pouch 36 to the seat belt, the cover 10 is readily available for the user.

It should be noted that in some embodiments, the cover 10 alone (e.g., without a pouch) may include a fastener mechanism (similar to ties 48a, 48b) for releasably coupling the cover 10 to a portion of a vehicular seat belt system. Accordingly, a separate receptacle or pouch would not be required, and, instead, the cover 10 alone would further be directly coupled to the seat belt or the like.

Additionally, or alternatively, the pouch 36 or cover 10 may be configured to be releasably coupled to other interior portions of the vehicle, so as to provide the cover 10 within close reach of a person (e.g., driver or passenger) while seated in the vehicle. For example, in some embodiments, either the pouch 36 or cover 10 may be configured to be releasably coupled to a portion of the middle console by any known fastening means (e.g., reusable adhesive, magnets, clips, slots, etc.).

Figure 8:
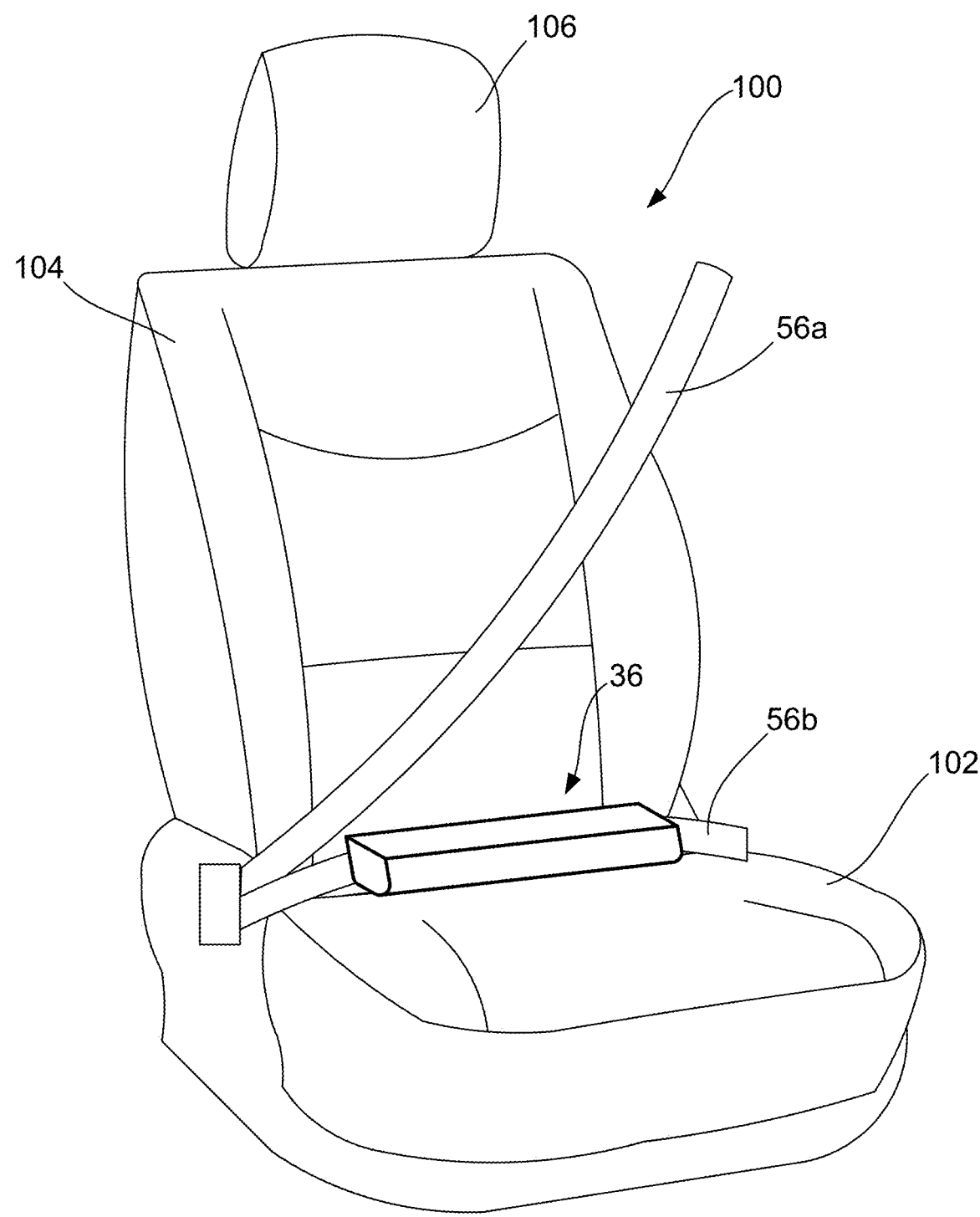
FIG. 8 is a perspective view of a vehicle seat and the receptacle of FIG. 7 releasably coupled to the lap portion of the seat belt.

FIG. 8 is a perspective view of a vehicle seat 100 and the pouch 36 releasably coupled to the seat belt. As shown, the seat 100 may generally include a seat portion 102, a back portion 104, and a headrest 106. For purposes of illustration, the pouch 36 is releasably coupled to the lap portion 56b of the seat belt. However, it should be noted that the pouch 36 may releasably coupled to the shoulder harness portion 56a of the seat belt. In either case, by coupling the pouch 36 to the seat belt, the cover is always within a user's reach, thereby improving the ease with which the cover 10 can be assembled and disassembled.

Figure 9:
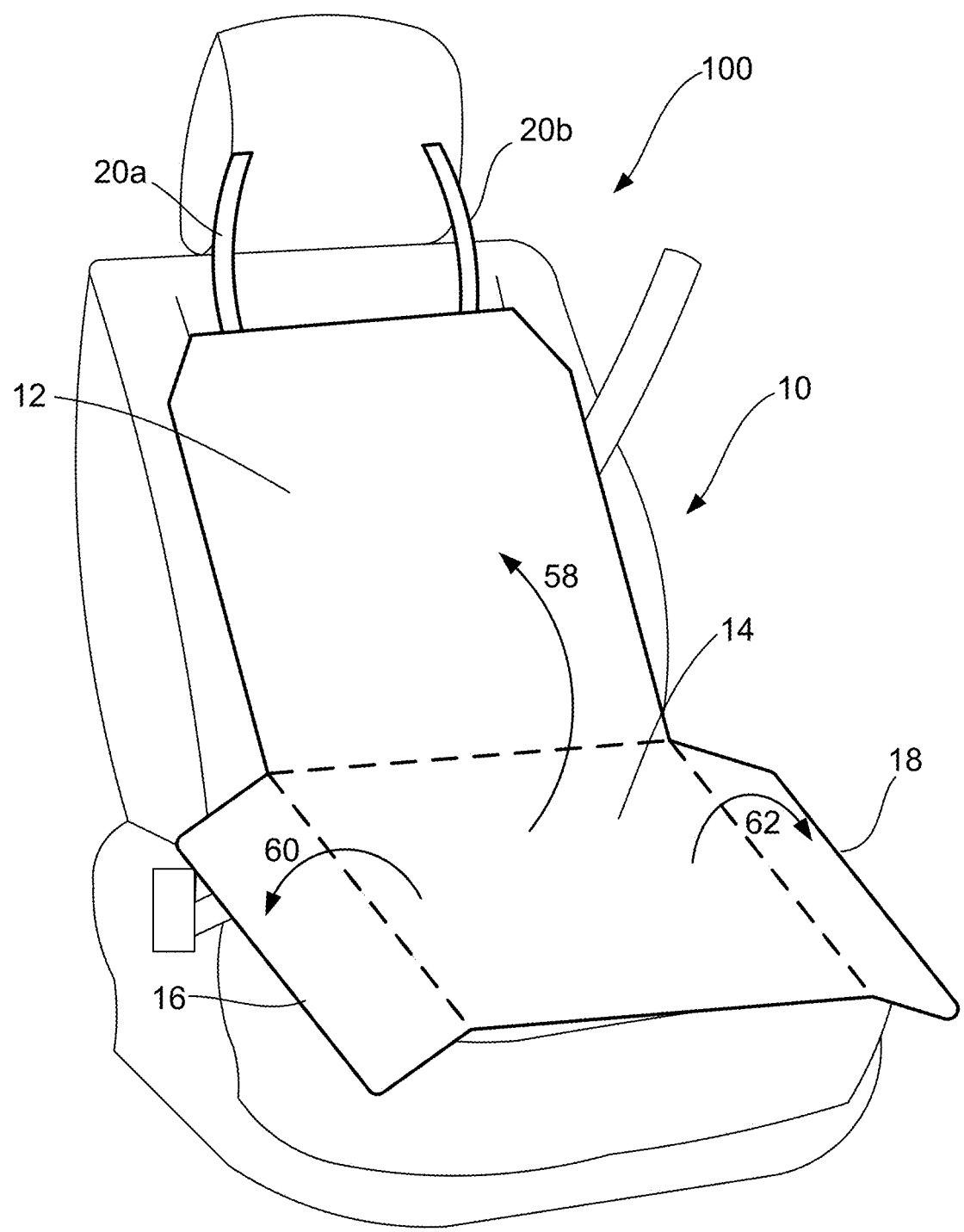
FIG. 9 is a perspective view of the protective cover positioned over the seat illustrating the protective cover transitioning from the compact state to the expanded state.

For example, as shown in FIG. 9, by providing the pouch 36 on the lap portion 56a, a user can easily and rapidly deploy the cover 10 for immediate use, requiring little or no effort on the user's part. for example, a user need only apply sufficient force to the bi-stable member 24 (not shown) so as to move the bi-stable member 24 from the compact configuration (e.g., rolled-up configuration) to the expanded configuration. This may require the user to simply unroll the cover 10. Upon substantially unrolling the cover 10, the bi-stable member 24 is configured to remain stable in the expanded state, such that a user then need only separate the upper member 12 from the lower member 14, as indicated by arrow 58. Then, a user need only separate side members 16, 18 from the lower member 14, as indicated by arrows 60 and 62. Accordingly, once in the expanded state, the upper member 12, lower member 14, and first and second side members 16, 18 are configured to provide adequate coverage over multiple portions of a user's body so as to prevent liquid and solid spills from contacting a user's clothing. Once finished, a user need only disassemble and move the cover 10 back into the compact state for storage.

Figure 10:
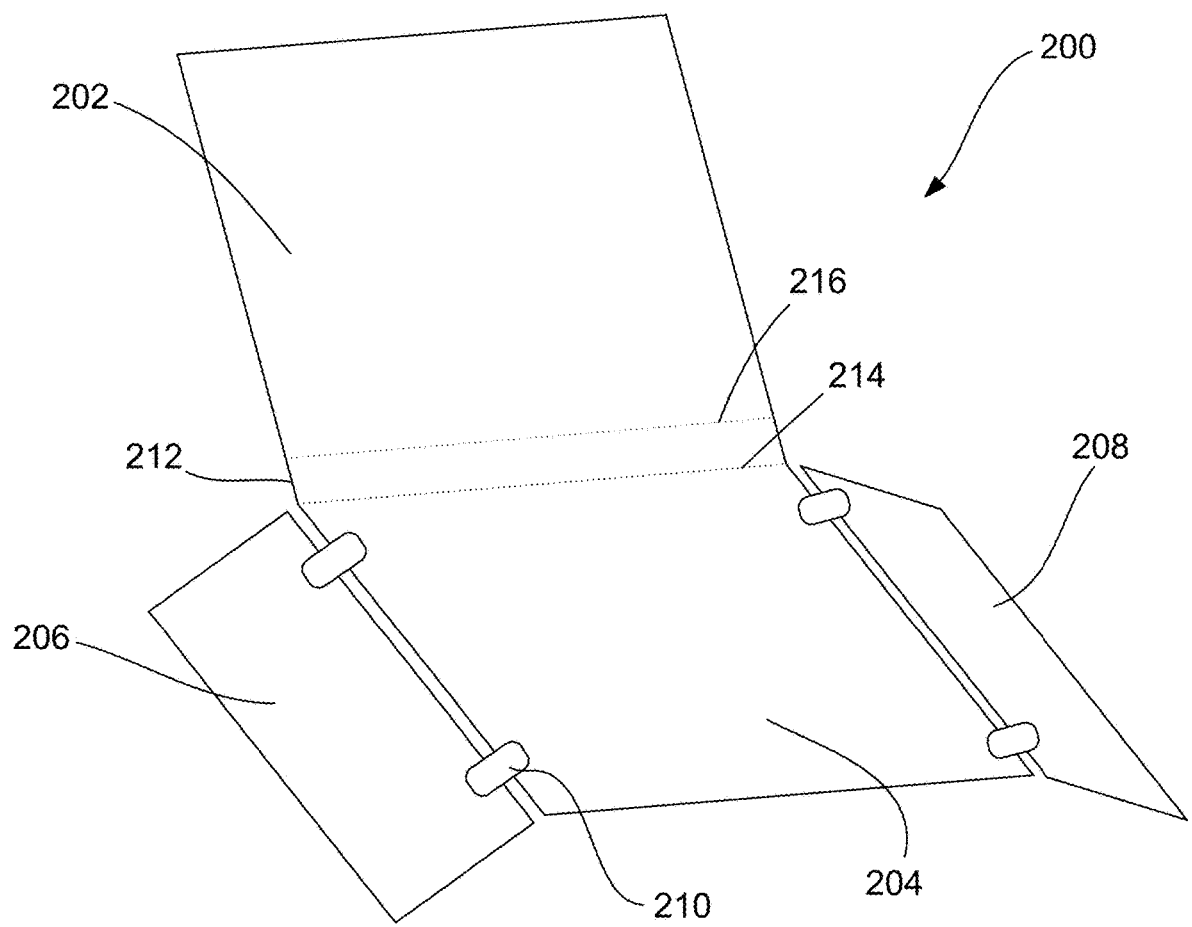
FIG. 10 is a perspective view of another embodiment of a protective cover in an expanded state consistent with the present disclosure.

FIG. 10 is a perspective view of another embodiment of a protective cover 200 consistent with the present disclosure. As shown, similar to protective cover 10 of FIG. 1, the protective cover 200 generally includes an upper member 202, a lower member 204 coupled to the upper member 202, and first and second side members 206, 208 coupled to and extending from opposing sides of the lower member 204. As shown, at least some of the members may be formed from a single piece of material. For example, in the illustrated embodiment, the upper and lower members 202, 204 are formed from the same material and the side members 206, 208 are coupled to the lower member 204 by way of a coupling means 210 (e.g., stitching, riveting, welding, stapling, adhesive bonding, hook and loop type fasteners, and/or any other suitable joining technology). Accordingly, the side members 206, 208 are discrete and separate from the upper and lower members 202, 204, thereby allowing adequate movement of the side members 206, 208 relative to the lower member 204 for transitioning between expanded and compact states, as described in greater detail herein.

As will be described in greater detail herein, the protective cover 200 is configured to transition between an expanded state (shown in FIG. 10) and a compact state (shown in FIG. 12). When in the compact state, the protective cover 200 has a wedge-like shape formed by the upper and lower members 202, 204 and a spine portion 212 between the upper and lower members 202, 204. The upper and lower members 202, 204 are moveable relative to one another by way of way of at least two hinges or flexure bearings 214, 216 defined on either side of the spine portion 212. For example, in the illustrated embodiment, the protective cover 200 includes two living hinges defined on either side of the spine portion 212. A lower living hinge 214 allows movement of the lower member 204 relative to the spine portion 212 and an upper living hinge 216 allows movement of the upper member 202 relative to the spine portion 212. Accordingly, upon moving the upper and lower members 202, 204 towards one another, the spine portion 212 maintains separation between the upper and lower members 202, 204 along one side, thereby resulting in contact between the upper and lower members 202, 204 on the opposing side so as to result in a wedge-like configuration when the protective cover 200 is in the compact state.

Figure 11:
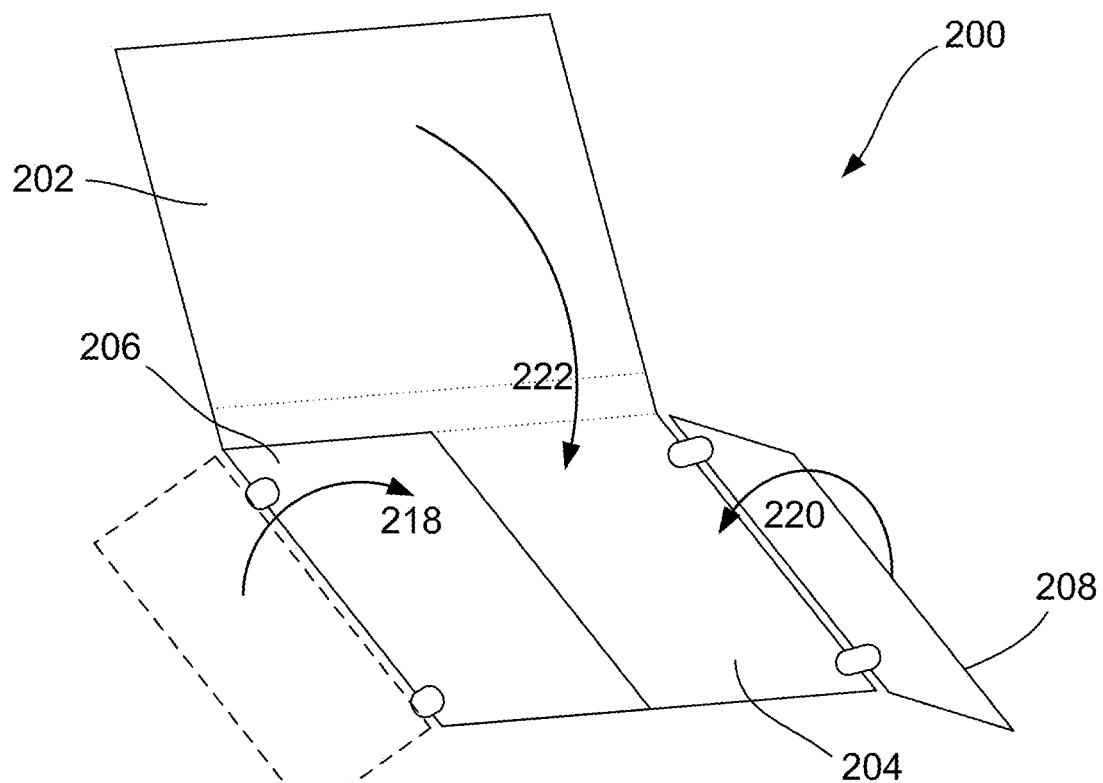
FIG. 11 is a perspective view of the protective cover of FIG. 10 illustrating the transitioning of the cover from the expanded state to a compact state.
Figures 12A, 12B:
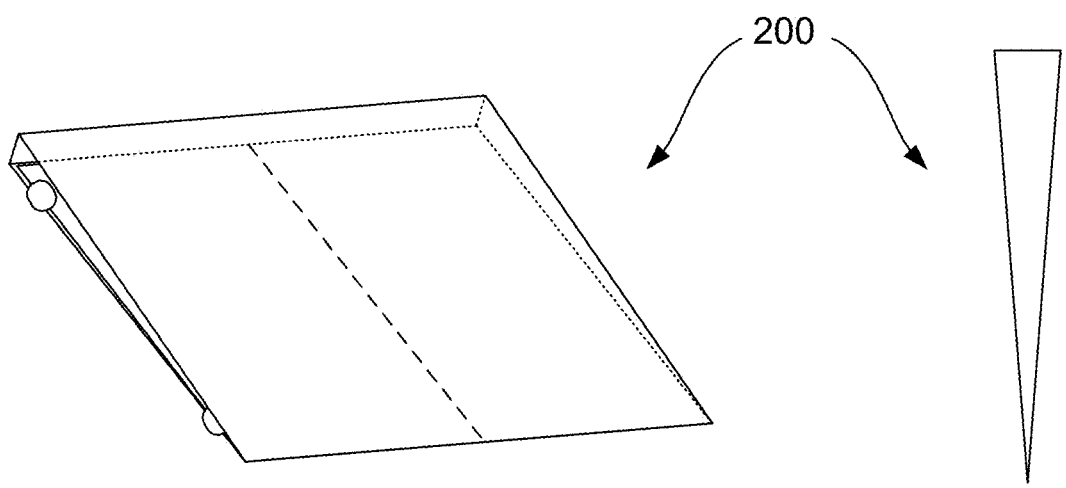
FIGS. 12A and 12B are perspective and side views of the protective cover of FIG. 10 in the compact state, illustrating the wedge-like arrangement created when in the compact state.

FIG. 11 is a perspective view of the protective cover 200 illustrating the transitioning of the cover 200 from the expanded state to a compact state. FIGS. 12A and 12B are perspective and side views of the protective cover 200 in the compact state, illustrating the wedge-like arrangement created when in the compact state. As previously described, the protective cover 200 of the present invention is configured to be rapidly assembled and disassembled. As shown, the first and second side members 206, 208 may each be folded inwardly towards the lower member 204, as indicated by arrows 218 and 220, respectively. Although not shown, in some embodiments, releasable fastening members, such as magnets or hook and loop fasteners, may be included on the first and second side members 206, 208, wherein such fastening members correspond to associated fastening members on the lower member 204 to allow coupling of the side members 206, 208 to the lower member 204. Upon folding the side members 206, 208 inwardly, the upper member 202 may then be folded inwardly to come into contact with the lower member 204, as indicated by arrow 222. Similarly, the upper member 202 may also include releasable fastening members corresponding to fastening members of the lower member 204.

Figure 13:
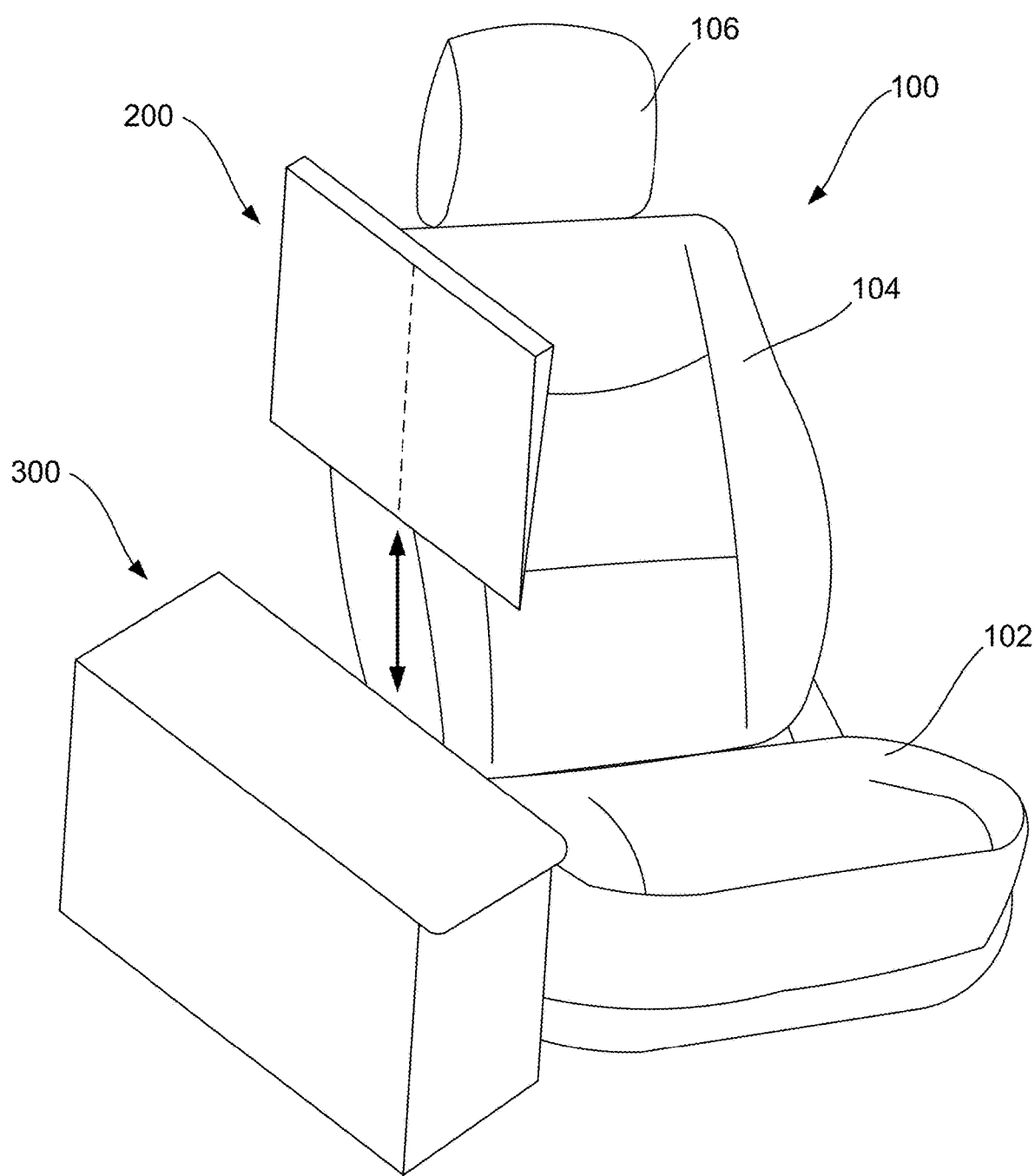
FIGS. 13-15 are perspective and side views of a vehicle seat and center console within a vehicle illustrating storage of the protective cover of FIG. 10 within the gap between the seat and console.
Figure 14:
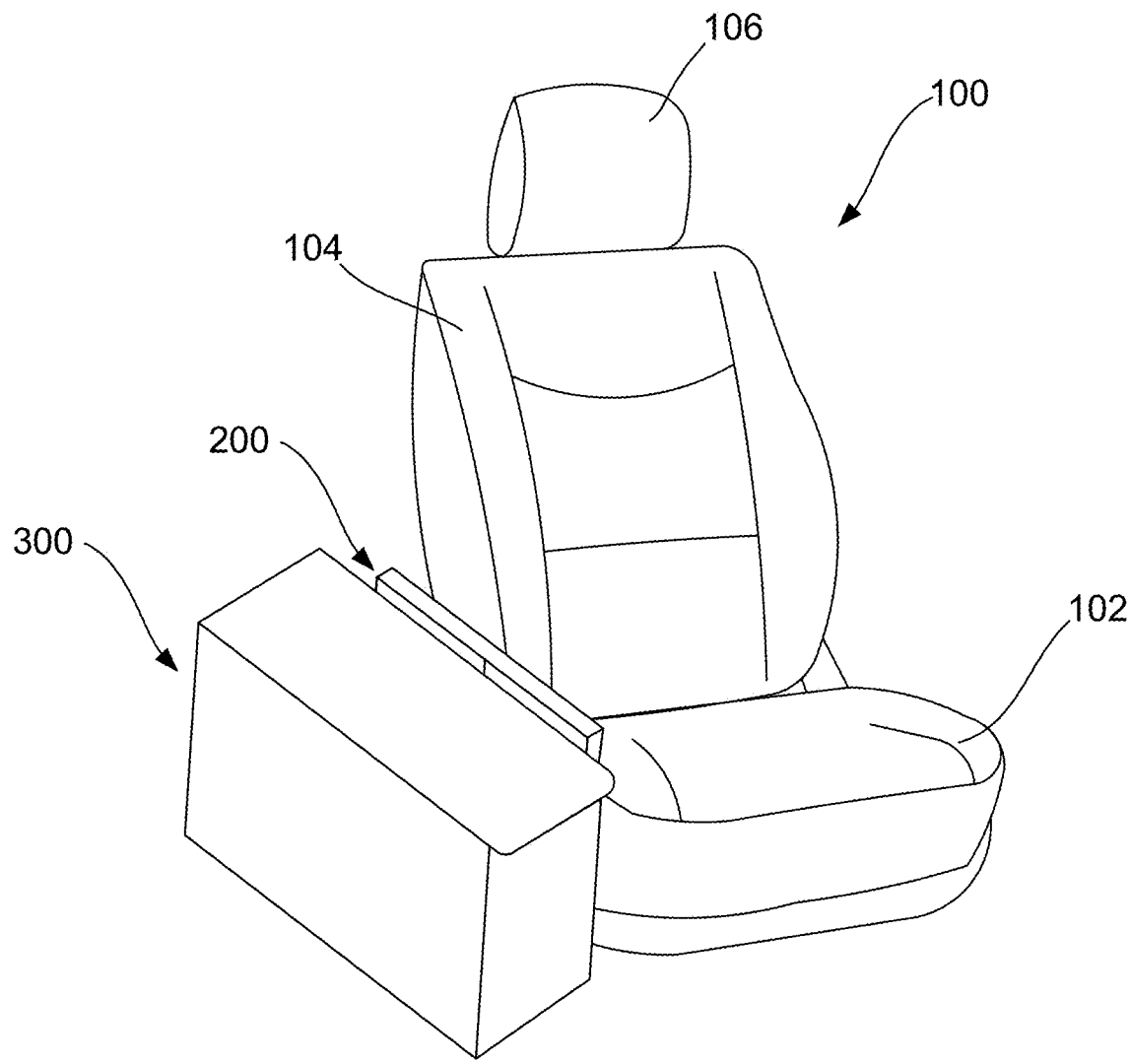
Figure 15:
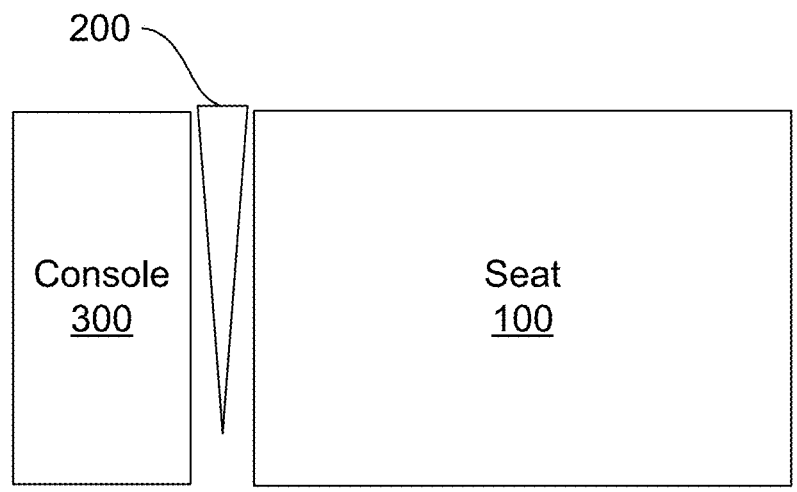

Once the upper, lower, and side members are folded together, the protective cover 200 is in a compact state and has a wedge-like shape, as shown in FIGS. 12A and 12B. Accordingly, once in the compact state, the cover 200 may be conveniently stored within the interior of the vehicle and within reach of the driver or passenger for subsequent use. In particular, the wedge-like shape is particularly ideal for storing the protective cover 200 within the gap between a car seat and adjacent console. For example, as shown in FIGS. 13-15, a vehicle (e.g., car) may include a vehicle seat 100 and a console 300 (e.g., driver or passenger seat with center console). As shown, the protective cover 200, when in the compact state, may be positioned within the gap between the seat 100 and console 300. The wedge-like shape allows the protective cover 200 to slide within the gap, while the spine portion 212 may be sufficiently sized so as to prevent the entire protective member 200 from residing within the gap. In other words, the spine portion 212 may have a specific width that is equal to or greater than the gap width between the seat 100 and console 300, thereby resulting in a majority of the cover 200 residing within the gap while preventing the cover 200 from falling entirely within the gap.

Figure 16:
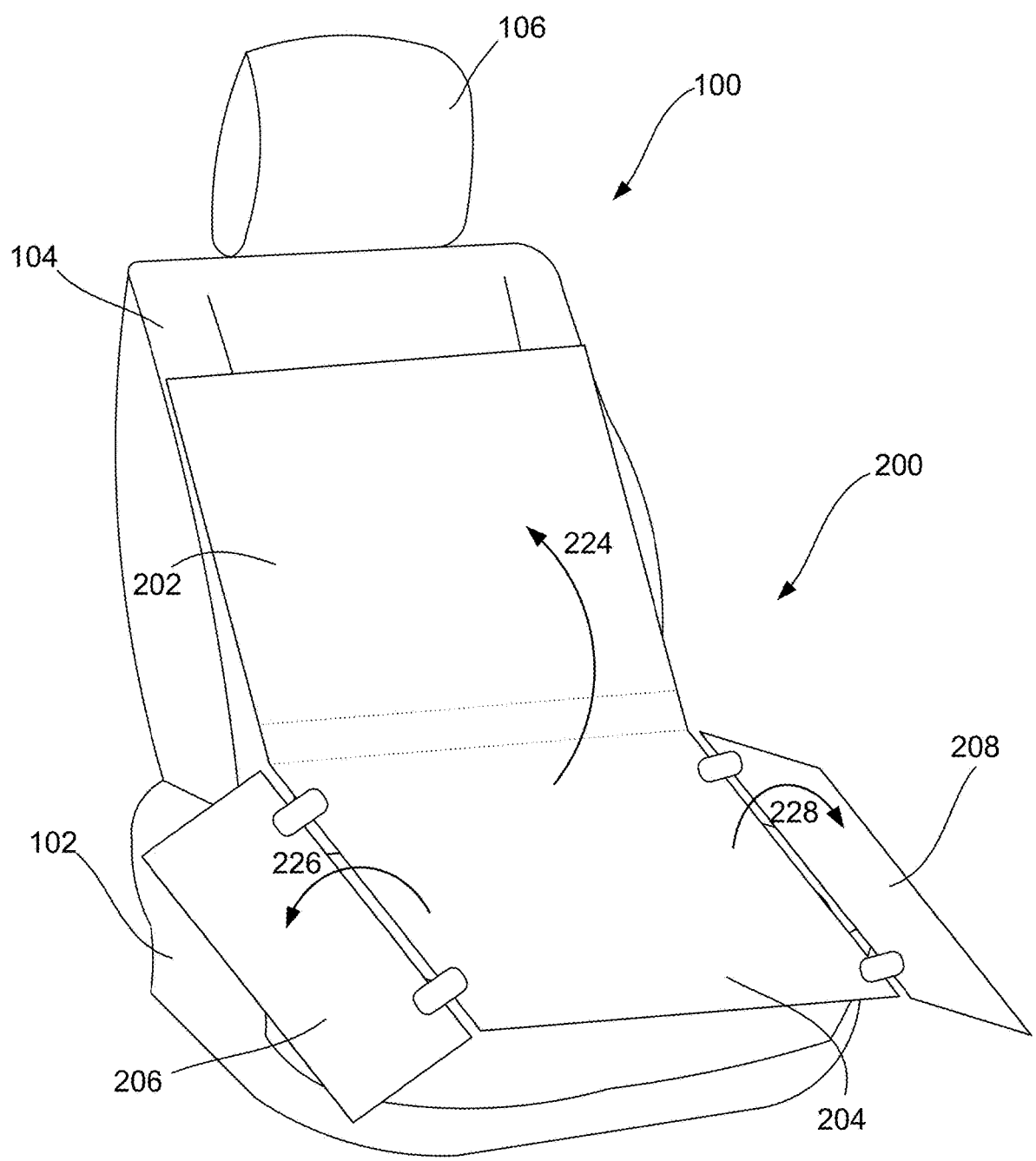
FIG. 16 is a perspective view of the protective cover FIG. 10 positioned over the seat illustrating the protective cover transitioning from the compact state to the expanded state.

FIG. 16 illustrates transition of the protective cover 200 from the compact state to the expanded state. By providing the cover 200 within the gap between the seat 100 and console 300, a user can easily and rapidly deploy the cover 200 for immediate use, requiring little or no effort on the user's part. For example, a user need only remove the cover 200 from the gap, lift the upper member 202 from the lower member 204, as indicated by arrow 224, and separate the side members 206, 208 from the lower member 204, as indicated by arrows 226 and 228. Accordingly, once in the expanded state, the upper member 202, lower member 204, and first and second side members 206, 208 are configured to provide adequate coverage over multiple portions of a user's body so as to prevent liquid and solid spills from contacting a user's clothing. Once finished, a user need only fold the members into one another to transition the cover 200 back into the compact state for storage.

When in the expanded state, as shown, the protective cover 200 is configured to cover multiple portions of a user's body so as to protect clothing from any spilled liquids or solids that a user may be consuming. For example, the upper member 202 is configured to cover at least a portion of a user's torso, including a user's chest and stomach. The lower member 204 is configured to cover at least a portion of the user's lap and thighs. The first and second side members 206, 208 are configured to cover side portions of the user's lap and thighs. Accordingly, once in the expanded state and positioned over a user's body, the protective cover 200 provides adequate protective coverage, particularly protecting areas of a user's body that are most susceptible to receiving debris or liquid.

The cover 200 may include any type of durable material configured to reasonably withstand and, in some cases, repel liquids or solids. The cover 200 may include absorbent, waterproof, and/or stain resistant materials. For example, an underside of the cover 200 (portion in direct contact with person's clothing) may be composed of a durable, waterproof material so as to prevent any solid or liquid from penetrating through the cover and into clothing. A top surface of the cover 200 (portion exposed to any spillage) may be composed of an absorbent material so as to trap liquid spills. Alternatively, the top surface of the cover 200 may be composed of a waterproof material. Additionally, or alternatively, one or more portions of the cover may be composed of a material having insulating properties, such as thermal insulation, so as to prevent the transfer of heat from a hot food or beverage through to a person's torso or lap. Accordingly, the cover 200 may be form from multiple layers, as generally understood by one skilled in the art. Durable materials may include, for example, molded polymers, plastics, neoprene, mesh, leather, vinyl, fabric, reinforced fabric, or any combination thereof.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A rapidly deployable protective cover configured to be worn over a portion of a user's body to protect from liquid or solid spills, the cover comprising:
   an upper member;
   a lower member materially coupled to the upper member;
   first and second side members materially coupled to and extending from opposing sides of at least one of the upper member and the lower member; and
   at least one bi-stable member configured to transition the cover between a compact state and an expanded state, wherein the at least one bi-stable member is coupled to at least one of the upper member, the lower member, and the first and second side members and wherein the at least one bi-stable member comprises at least two stable configurations and is elastically deformable between the first and second stable configurations, and wherein, when in the first stable configuration, the bi-stable member has a compact shape and thereby results in the cover having a compact state and wherein the compact shape is a rolled configuration such that at least one of the upper member, the lower member, and the first and second side members coupled to the bi-stable member has a corresponding rolled configuration.

2. The cover of claim 1, wherein at least one of the upper member, the lower member, and the first and second side members further comprises a fastener mechanism for releasably coupling the cover to a portion of a vehicular seat belt system and wherein the fastener mechanism comprises a pair of opposing ties configured to be releasably coupled to one another around a shoulder harness portion or a lap portion of the seat belt system.

3. The cover of claim 1, further comprising an insertable member configured to provide a substantially planar surface on the lower member thereby providing a user with a stable surface for food or beverages when in a seated position.

4. The cover of claim 1, wherein, when in the second stable configuration, the bi-stable member has an expanded, substantially planar shape along a length thereof, thereby resulting in the cover having an expanded state and wherein at least one of the upper member, the lower member, and the first and second side members coupled to the bi-stable member has a corresponding expanded configuration when the bi-stable member is in the second stable configuration.

5. The cover of claim 4, wherein, when the bi-stable member is in the second stable configuration and the cover is in the expanded state, the upper member is configured to cover at least a portion of a user's torso, the lower member is configured to cover at least a portion of the user's lap, and the first and second side members are configured to cover side portions of at least one of the user's torso or user's lap.

6. The cover of claim 1, wherein, when the cover is in the compact state, the overall area of the cover is smaller than the overall area of the cover when the cover is in the expanded state.

7. The cover of claim 1, wherein, when the cover is in the compact state, at least two of the upper member, the lower member, and the first and second side members are releasably coupled to one another via one or more releasable fastening members and wherein one or more releasable fastening members are selected from the group consisting of: one or more magnets, hook and loop fasteners, snap-fit fasteners, adhesive, and a combination thereof.

8. The cover of claim 1, further comprising a pair of opposing ties materially coupled to the upper member and configured to be releasably coupled to one another around the user's neck.

9. A system configured to protect a user from liquid or solid spills, the system comprising:
   a rapidly deployable protective cover configured to be worn over a portion of a user's body, the cover comprising:
   an upper member;
   a lower member materially coupled to the upper member;
   first and second side members materially coupled to and extending from opposing sides of at least one of the upper member and the lower member; and
   at least one bi-stable member coupled to at least one of the upper member, the lower member, and the first and second side members, and configured to elastically deform between a stable compact configuration and a stable expanded configuration to thereby transition the cover between a compact state and an expanded state, respectively; and
   a receptacle configured to receive and house the cover when the cover is in the compact state, the receptacle comprising a fastener mechanism for releasably coupling the receptacle to a portion of a vehicular seat belt system.

10. The system of claim 9, wherein the compact configuration is a rolled configuration such that at least one of the upper member, the lower member, and the first and second side members coupled to the bi-stable member has a corresponding rolled configuration.

* * * * *